Figure 1:
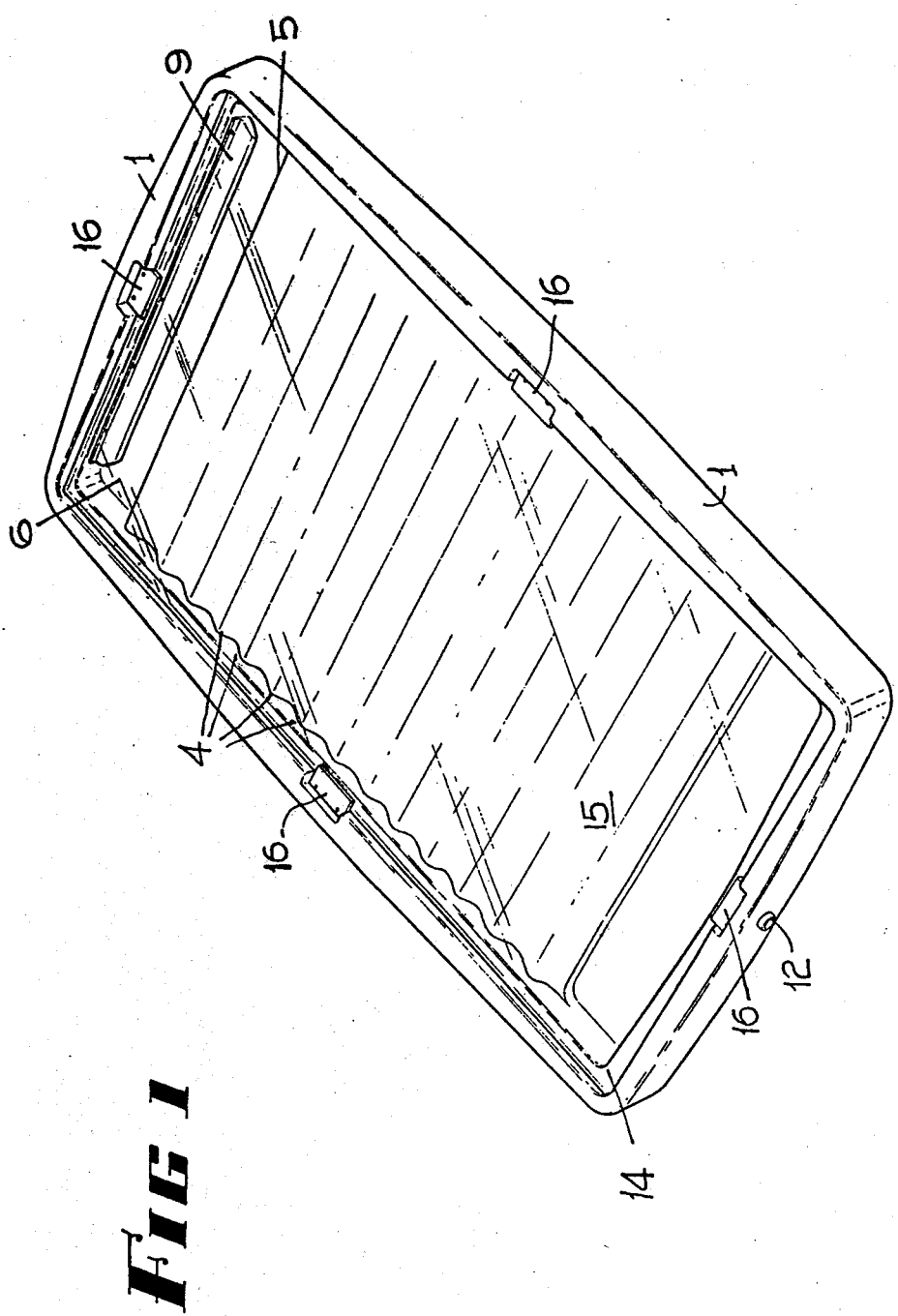

United States Patent [19]

Ward

[11] 4,180,057
[45] Dec. 25, 1979

[54] CASCADE SOLAR FLUID HEATER

[75] Inventor: John Ward, Semaphore, Australia

[73] Assignee: Jessop Enterprises Pty. Ltd., Adelaide, Australia

[21] Appl. No.: 834,792

[22] Filed: Sep. 16, 1977

[51] Int. Cl.² ............................................. F24J 3/02
[52] U.S. Cl. .................................. 126/449; 237/1 A
[58] Field of Search ............... 126/270, 271; 237/1 A

[56] References Cited

U.S. PATENT DOCUMENTS

| 2,277,311 | 3/1942 | Freeman | 126/271 |
|---|---|---|---|
| 3,254,643 | 7/1966 | Thomason | 126/271 |
| 3,910,253 | 10/1975 | Thomason et al. | 126/271 |
| 3,943,911 | 3/1976 | Yu | 126/271 |
| 3,989,031 | 11/1976 | Thomason et al. | 126/271 |
| 4,033,325 | 7/1977 | Walker | 126/271 |
| 4,047,518 | 9/1977 | Anderson | 126/271 |
| 4,048,981 | 9/1977 | Hobbs | 237/1 A |
| 4,085,732 | 4/1978 | Hysom | 126/271 |
| 4,120,288 | 10/1978 | Barrett | 126/271 |
| 4,124,020 | 11/1978 | Noble | 126/271 |

FOREIGN PATENT DOCUMENTS 325928  3/1930  United Kingdom .................... 126/271

Primary Examiner—Samuel Scott
Assistant Examiner—Larry Jones
Attorney, Agent, or Firm—Haseltine, Lake & Waters

[57] ABSTRACT

The solar water heater is positioned in an inclined manner with an inlet at the upper portion and an outlet at the lower portion so that the water flows downwardly over a series of corrugations extending transversely to the direction of flow of water, the water spilling over each corrugation in turn.

10 Claims, 3 Drawing Figures

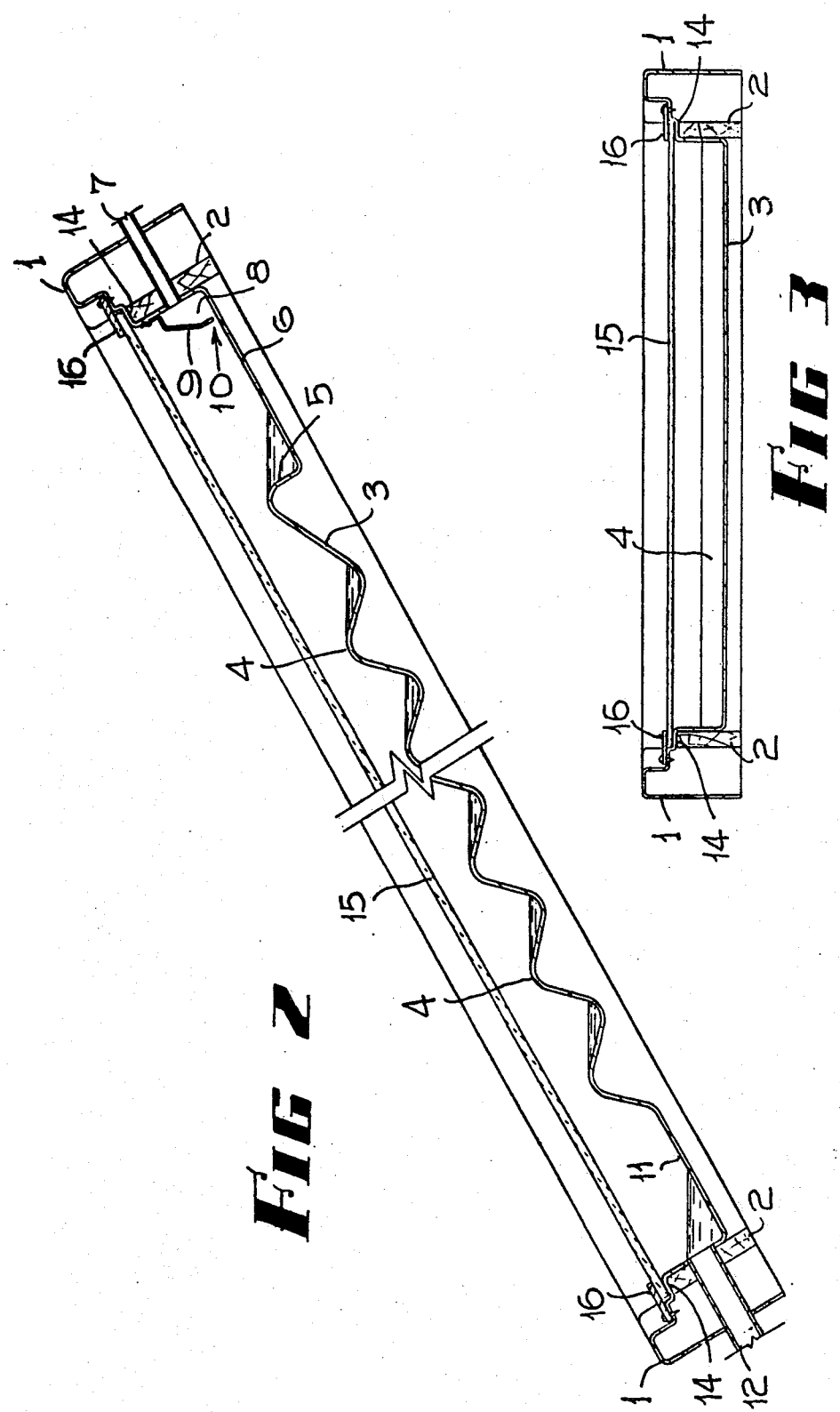

CASCADE SOLAR FLUID HEATER

The invention relates to a solar water heater which can be used either in connection with water storage systems or under any conditions where water requires to be raised in temperature such for instance as for heating swimming pools or the like and preferably while keeping the chlorine level relatively constant.

Solar heaters as generally used in the past have consisted of pipes or tubing in which the water is caused to flow and which are heated by the rays of the sun preferably by protecting the tubing under one or more layers of transparent material such as glass and to achieve good heat absorption the pipes or tubes are usually painted black so that there is maximum heating effect.

It has been proposed also to pass liquid such as black oil through clear tubing so that there is a more direct contact of the medium being heated with the rays of the sun, and according to one type of device previously used two sheets of glass or other transparent medium was used in association with a water flow over a surface and amongst this type of heater was also the general idea of using lenticular glass to provide certain localised heated areas.

The object of the present invention however is to achieve better flow control of the water being heated and to enable a device to be so built that it need not be as accurately positioned as has been necessary heretofore as obviously water flowing over a surface will tend to channel and if there is any unevenness in the installation the water heating effect will be lost because of the channelling along certain areas.

The object of the present invention is achieved by providing a laterally corrugated sloping surface, which is preferably a black surface so as to form a heat absorber, the sheet being protected on the side facing the sun by one or more sheets of glass or other material transparent to solar radiation, one of which sheets may be lenticular or have lenticular sections, and the slope of the sheet is such that water from a distributor positioned laterally across the top of the device will flow into the troughs formed by the corrugations and as each corrugation receives water, the water will spill over into the next corrugation and so on until the lower end of the system is reached where the water is gathered in a suitable collector such as a trough.

The black absorber surface can be provided by forming the back and surround of the unit from a sheet of polythene or PVC or by cementing or otherwise attaching a sheet of polythene or PVC to the exposed face of a corrugated metal sheet, the plastic having a high heat absorbency and also durability under the extreme heating conditions in the enclosed space in which the water cascades.

The angle of the corrugated surface is such that while troughs are formed to hold water, outflow from the troughs over the corrugations results in a very thin layer of water over the corrugations which ensures high heat transfer at these localities.

The order however that the invention may be more fully understood an embodiment thereof will be described with reference to the accompanying drawings in which:

FIG. 1 is a perspective view of such a unit arranged particularly as a swimming pool heater FIG. 2 is a longitudinal section of same, and FIG. 3 is a transverse section thereof.

The panel as shown is constructed to have a rectangular surround 1 which is of inverted "U" shape and which is reinforced by a frame 2 and includes a heat absorber surface which extends across the space between the surround frame 2, the surface 3 being corrugated to form a path over which the water to be heated cascades.

The surface 3 is disposed a distance below the top of the surround frame and has formed in it a series of transverse corrugations 4 but at one end, which is the higher end when the device is in use, is formed a weir 5 so that water will flow over this weir when discharged into a first trough 6 from the inlet 7. The inlet 7 is disposed medially in relation to the trough 6 and discharges water into a space 8 which is defined between the surround 1 and the floor of the trough 6 and a baffle 9, the baffle 9 terminating a distance above the floor of the trough 6 to leave a gap 10 through which an outflow of water to the trough 6 will take place and when this gap is horizontally disposed it will be found that the water will discharge evenly across the width of the trough 6 to then flow into the space adjacent the weir 5 and then over the horizontal weir to cascade down over the transverse corrugations to a second through 11 which is formed at the lower end of the unit.

An outlet 12 through the surround 1 leads the heated water from the second trough 11 to a required area such as into a pool or for storage or heat transfer.

The surround 1 has a ledge 14 formed on its inner part which is adapted to receive a cover glass 15, clips 16 which engage the surround holding the glass against displacement from the ledge 14.

The baffle 9 ensures that the water flow is spread across the whole of the absorber surface but this could be replaced by a black PVC pipe extending across the absorber surface and pierced with hot needles of perhaps 1.5 millimeter to provide holes at say a 12 millimeter pitch, such a device again ensuring that the water will flow uniformly over the sloping corrugated surface where the water will be trapped at each corrugation until the corrugation is filled and excess will pass on to the next corrugation and so on until the complete area has a flow of water over it which is then recycled if required such as by letting it discharge into a swimming pool or the water can flow to a storage tank or the like or it can go to a storage tank and can then be pumped through heating coils in a pool or other locality where the heating is to be effected.

The lateral corrugations in the absorber surface tend to slow down the water by part filling the corrugations before overflow takes place but the angle can be such that very little water is actually held in any of the corrugations before it spills over into the next corrugation.

The cover glass could include lenticular members used to direct rays of solar energy onto any appropriate parts of the corrugated absorber surface so that high temperature spots exist over which the water must flow, but as shown in the drawings the cover member may simply be a sheet of glass or the like. It ensures that the bottom is protected against loss of conventional heat to the atmosphere.

It will be realized from the foregoing that a simple and effective device is provided which can be in the form of a panel and which is inclined to the horizontal ideally at an angle which equals the latitude of the location in use and which has a laterally corrugated heat receiving surface in it protected on the side facing the sun by still air formed beneath the transparent panel and, if required, on the other side by insulating material such as fibre-glass or timber but preferably with aluminum foil interposed to ensure that any heat which would otherwise be lost in the insulation material is reflected back to the corrugated absorber surface which is the natural heat receiving member and which then imparts heat to the water flow over this corrugated absorber surface.

Any number of such panels can be used and the panels themselves can be movable if necessary to face the sun or reflectors can be used to angle the rays of the sun into the device, but a simple installation would simply be to have a number of these panels facing generally the area exposed to the heat of the sun's rays and the medium such as water (other liquids could be used and are included in the expression "liquid") being then passed into a pool or storage tanks which are insulated to hold the heat or flow can be through radiators or the like depending on the use to which the device is to be put.

I claim:

1. A solar water heater comprising a surround defining a substantially rectangular space and joining to a heat absorber surface which extends between the said surround to define an area through which water can flow over said surface when said surface is inclined in relation to a horizontal plane, an inlet to discharge water into a first trough at one edge portion of the said absorber surface, a baffle across the said inlet within said first trough, said baffle being arranged to discharge water across the width of the said first trough, said baffle terminating above the surface of the said first trough to form a transversely extending gap between it and the said surface to discharge water evenly across the width of the said trough, an outlet to receive water from a second trough at the opposite edge portion of the said absorber surface, a series of corrugations formed in said absorber transversely to the direction of flow of water from said first trough to the said second trough, and a cover over said absorber spaced therefrom which is selected to admit solar radiation to said absorber surface.

2. A solar water heater according to claim 1, further comprising a weir at the termination area of flow in the said first trough, whereby water flows over said weir from said first trough to flow over said series of corrugations.

3. A solar water heater according to claim 1 wherein said heater is formed from a sheet of heat absorbing plastic which is formed to have an upstanding surround to define a water flow space.

4. A solar heater according to claim 3 wherein the surround is formed to be of inverted "U" shape, and extends upwardly, from the inner portion of the said sheet.

5. A solar heater according to claim 3 wherein the said surround includes a ledge on its inner part to receive the marginal portion of the said cover to support same.

6. A solar water heater comprising a sheet of plastic material shaped to have a marginal surround defining a substantially rectangular space around a heat absorber surface formed by said sheet which said surface extends between the said surround to form an area through which water can flow over said heat absorber surface when said surface is inclined in relation to a horizontal plane, an inlet to discharge water into a first trough at one edge portion of the said absorber surface, a baffle across the said inlet within said first trough, said baffle being arranged to discharge water across the width of the said first trough, said baffle terminating above the surface of the said first trough to form a transversely extending gap between it an the said surface to discharge water evenly across the width of the said trough, an outlet to receive water from a second trough at the opposite edge portion of the said absorber surface, a series of corrugations formed in said absorber surface transversely to the direction of flow of water from said first trough to the said second trough and extending to the said surround, and a cover over said absorber spaced therefrom and selected to admit solar radiation to said absorber surface.

7. A solar water heater according to claim 6 wherein the said heater is formed from a sheet of heat absorbing plastic which is formed to have an upstanding surround to define a water flow space.

8. A solar water heater according to claim 6 wherein the said heater is formed from a sheet of heat absorbing plastic which is formed to have an upstanding surround to define a water flow space, said surround being formed to be of inverted "U" shape, and extending upwardly, from the inner portion of the said sheet, and a ledge on the inner part of said surround to receive the marginal portion of the said cover to support same.

9. A solar water heater according to claim 6 comprising a weir at that edge of the said first trough remote from the said inlet whereby water is spread laterally over the said absorber surface.

10. A solar water heater comprising a sheet of black plastic heat-absorption material moulded to have a marginal surround defining a substantially rectangular space around a heat absorber surface formed by said sheet, which said surface extends between the said surround to form an area through which water can flow over said heat absorber surface when the said surface is inclined to the horizontal, an inlet to discharge water into a first trough at the upper edge portion of the said absorber surface when so inclined, a baffle across the said inlet within said first trough, said baffle being arranged to discharge water across the width of the said first trough, said baffle terminating above the surface of the said first trough to form a transversely extending gap between it and the said surface to discharge water evenly across the width of said trough, an outlet to receive water from a second trough at the lower edge portion of the said absorber surface when so inclined, a series of corrugations formed in said absorber surface transversely to the direction of flow of water from said first trough to the said second trough and extending to the said surround, and a cover transparent to solar radiation over said absorber spaced therefrom and having its edges engaged in a ledge formed in said surround.

* * * * *